(12) United States Patent
Netzband et al.

(10) Patent No.: US 12,710,344 B2
(45) Date of Patent: Aug. 18, 2026

(54) TORSIONAL SHEAR TESTING FOR SEMICONDUCTOR SURFACE BONDS

(71) Applicant: Tokyo Electron Limited, Tokyo (JP)

(72) Inventors: Christopher Michael Netzband, Albany, NY (US); Adam Gildea, Albany, NY (US); Ilseok Son, Albany, NY (US)

(73) Assignee: Tokyo Electron Limited, Tokyo (JP)

( * ) Notice: Subject to any disclaimer, the term of this patent is extended or adjusted under 35 U.S.C. 154(b) by 309 days.

(21) Appl. No.: 18/528,242

(22) Filed: Dec. 4, 2023

(65) Prior Publication Data

US 2025/0180453 A1 Jun. 5, 2025

(51) Int. Cl.

*G01N 19/04* (2006.01)
*G01N 3/22* (2006.01)
*G01N 3/24* (2006.01)
*G01N 3/34* (2006.01)

(52) U.S. Cl.

CPC ................ *G01N 3/22* (2013.01); *G01N 3/24* (2013.01); *G01N 3/34* (2013.01); *G01N 2203/0003* (2013.01); *G01N 2203/0005* (2013.01); *G01N 2203/0021* (2013.01); *G01N 2203/0025* (2013.01); *G01N 2203/0073* (2013.01)

(58) Field of Classification Search

CPC ...................................................... G01N 19/04

See application file for complete search history.

(56) References Cited

U.S. PATENT DOCUMENTS 6,967,166 B2 11/2005 Basol
11,904,556 B2 * 2/2024 Hoeflaak ................. G01N 3/24
2012/0234497 A1 9/2012 Han
2013/0105538 A1 5/2013 Young
2014/0020818 A1 1/2014 Huang

FOREIGN PATENT DOCUMENTS

DE 10200401109 B3 * 12/2005
WO WO-2011028107 A1 * 3/2011 ............. H01L 24/26

OTHER PUBLICATIONS

Albright, "Hybrid Bonding Basics: What is Hybrid Bonding?," Semiconductor Engineering, Aug. 18, 2022, https://semiengineering.com/hybrid-bonding-basics-what-is-hybrid-bonding/, accessed on Dec. 4, 2023, 9 pages.

Applied Materials, "Hybrid Bonding," https://www.appliedmaterials.com/us/en/semiconductor/markets-and-inflections/heterogeneous-integration/hybrid-bonding.html, 6 pages, accessed on Dec. 4, 2023.

Atomica, "What is wafer bonding andhow does it apply to MEMS?," https://atomica.com/what-is-wafer-bonding/?creative=632734618702&keyword=&matchtype=&network=g&device=c&gclid=Cj0KCQjwmlCoBhDxARIsABXkXIIP89fUFQcRwEfu6PICRz_N39YabNgbb3XsypYFaKgZVz12SB8rzcgaAiBGEALw_wcB, accessed on Dec. 4, 2023, 14 pages.

(Continued)

*Primary Examiner* — John E Breene
*Assistant Examiner* — Alex T Devito
(74) *Attorney, Agent, or Firm* — Slater Matsil, LLP

(57) ABSTRACT

A method of testing semiconductor surface bonds includes centering a torsional shear tool with respect to a first die having a surface bond to a wafer, clamping the first die using the torsional shear tool, applying a torsional load to the first die with respect to the wafer using the torsional shear tool, and measuring a torque value associated with the torsional load.

18 Claims, 7 Drawing Sheets

(56) References Cited

OTHER PUBLICATIONS

Harendt et al., "Silicon fusion bonding and its characterization," Journal of Micromechanics and Microengineering Jan. 1999, https://www.researchgate.net/publication/231154085, 5 pages.
Pantzas et al., "Measuring the surface bonding energy: A comparison between the classical double-cantilever beam experimentand its nanoscale analog," AIP Advances, vol. 10, Issue 4, Apr. 2, 2020, 9 pages.
Uhrmann et al., "Die-to-Wafer Bonding Systems," www.EVGroup.com, https://www.evgroup.com/products/bonding/die-to-wafer-bonding-systems#:~:text=Several%20different%20D2W%20bonding%20methods,%2Dplace%20flip%2Dchip%20bonder., accessed on Dec. 4, 2023, 6 pages.
Uhrmann et al., "Die-to-Wafer Bonding Steps into the Spotlight on a Heterogeneous Integration Stage," EV Group, www.EVGroup.com, Apr. 2021, 4 pages.
Wikipedia, "Three-dimensional integrated circuit," accessed on Dec. 4, 2023, 20 pages.
International Search Report and Written Opinion, PCT Application No. PCT/US2024/042459, mailed Nov. 26, 2024, 10 pages.

* cited by examiner

TORSIONAL SHEAR TESTING FOR SEMICONDUCTOR SURFACE BONDS

TECHNICAL FIELD

The present disclosure relates generally to torsional shear testing and, more particularly, to torsional shear measuring bond energy between two semiconductor surfaces, such as between two wafer portions or between a die and a wafer.

BACKGROUND

In the semiconductor industry, technological advancement has historically been achieved by scaling down generational technology nodes to ever smaller features and critical dimensions. In recent years, due to a variety of factors including increasing cost and complexity of nodes in nanometer ranges, heterogenous integration of different semiconductor parts, such as different types of chiplets and die, into advanced packages has become an increasingly important economic factor in the semiconductor industry. In particular, a need for ever greater numbers of transistors in applications that push performance limits, such as high-performance computing, artificial intelligence, machine vision, and autonomous vehicles and robots, among others, has made such advanced heterogenous packages more economically important. The economic advantages of heterogenous integration can include the ability to combine or mix semiconductor parts from different technology nodes into a single package. In this manner, the complexity or scope of portions of the single heterogenous package that need the latest but most resource-intensive technology nodes, e.g., 7 nm or 3 nm nodes, can be reduced or minimized, which can lead to overall economic optimization.

Accordingly, heterogenous integration may represent various methods for bonding parts such as chiplets and die together, often extending in the vertical direction using processes referred to as hybrid bonding and three-dimensional (3D) integrated circuits (IC). Such hybrid bonded parts may function as a single IC or chip and may exploit different technology nodes for different portions of the final part, in order to optimize costly processing and enable industrial volume scaling. While various types of ICs and bonding methods may be used, stacked die are often fusion bonded and subsequently connected electrically using through-silicon vias (TSVs), while hybrid bonded connections are often used to form a stacked or 3D IC part by directly connecting copper contacts through either die to wafer (D2 W) or wafers to other wafer (W2 W) bonding. The bonding process can employ a variety of bonding techniques and often employs chemical-mechanical planarization (CMP), as well as surface activation and hydration steps to prepare ideal bonding surfaces.

As more semiconductor parts are bonded together to form 3D ICs, characterization and evaluation of surface bond integrity become increasingly important in the semiconductor industry.

SUMMARY

A method of testing semiconductor surface bonds includes centering a torsional shear tool with respect to a first die having a surface bond to a wafer, clamping the first die using the torsional shear tool, applying a torsional load to the first die with respect to the wafer using the torsional shear tool, and measuring a torque value associated with the torsional load.

Another method of testing semiconductor surface bonds includes centering a torsional shear tool with respect to a first wafer portion having a surface bond to a second wafer portion, where the second wafer portion is held fixed with respect to the torsional shear tool. The method further includes clamping the first wafer portion using the torsional shear tool, applying a torsional load to the first wafer portion with respect to the second wafer portion using the torsional shear tool, and measuring a torque value associated with the torsional load.

A torsional shear tool for testing bond strength of semiconductor surface bonds includes a frame fixed to a spindle enabled to apply torque to the frame, and at least one pair of opposing jaws coupled to the frame, the opposing jaws enabled to clamp a semiconductor die at vertical edges of the semiconductor die and transmit the torque applied by the spindle to the semiconductor die. In the torsional shear tool, when the semiconductor die has a surface bond to a substrate that is held stationary with respect to the torsional shear tool, the spindle and opposing jaws can be enabled to apply a torque value of the torque sufficient to break the surface bond, wherein the torque value is applied in-plane to the surface bond.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner. For a more complete understanding of the present disclosure and its features and advantages, reference is now made to the following description, taken in conjunction with the accompanying drawings, in which.

DETAILED DESCRIPTION OF ILLUSTRATIVE EMBODIMENTS

Figure 1:
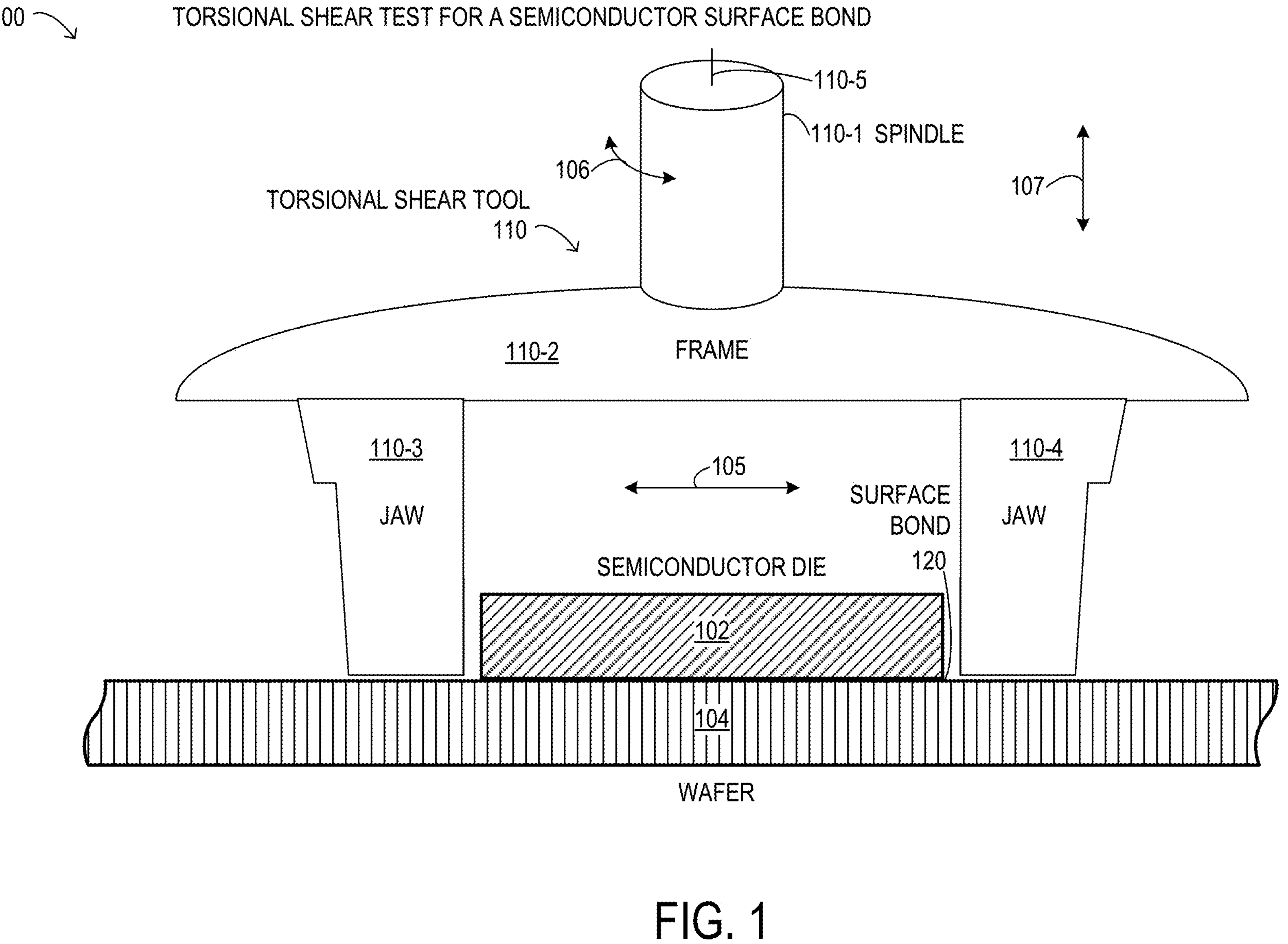
FIG. 1 is a depiction of a torsional shear test for a semiconductor surface bond in one embodiment.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Fusion bonding is a bonding technique in which two dielectric surfaces are brought together and bonded typically by an annealing process. For example, in fusion wafer bonding, two pretreated wafers are brought in proximity to each other and adhere to each other at room temperature. The pretreatment of the wafers may include cleaning and preparation of the surface for the bonding reaction that can involve forming Si—O—Si bonds between the surface of the two wafers, whereby water is released. Accordingly wet cleaning processes and plasma hydrophilization are surface treatments that can promote fusion wafer bonding. Thus the surface bonds subject to testing according to the methods and systems disclosed herein can include wafers bonded with fusion bonds.

In hybrid bonding techniques, besides bonding together dielectric surfaces, metallic interconnects may also be bonded together during an annealing process. For example, pretreated wafers may be aligned such that the dielectric surfaces of the wafers being bonded are brought together while the metallic interconnects of the wafers being bonded are brought together. During the subsequent annealing process, while the dielectric surfaces fuse together, the metallic interconnects may also form a bond.

As noted above, copper-copper bonded interconnections, among other types of interconnections and bonds, are often used to form a stacked or 3D IC part by hybrid bonding die to wafers (D2 W) or wafers to other wafers (W2 W). Such hybrid bonding techniques that stack parts on top of each other and use ultra fine copper (Cu) interconnects (10 μm or smaller) have the potential to enable further performance gains and lower power consumption, which are desirable in the semiconductor industry. In addition to Cu—Cu bonds, such hybrid bonded parts may incorporate dielectric-dielectric (e.g., $SiO_2$) bonds or polymer-polymer bonds between the Cu—Cu bonds. Such hybrid bonds can be permanent bonds that provide functional embedded metal (e.g., Cu) pads at the bond surface that are mated after surface preparation for a nearly perfect planar bond, also referred to as a direct bond interconnect (DBI).

For the D2 W hybrid bonding technique, a wafer may be formed with tens or hundreds of die that are subject to individual face-to-face bonding with another die that has been sliced from another wafer. Such face-to-face D2 W bonding may be performed using flip-chip bonders or other automated systems. D2 W hybrid bonding may be particularly advantageous since the automated processing of multiple parts can be performed during a single machine cycle. The automated processing associated with D2 W hybrid bonding may include functional testing of the hybrid bonded part using exposed pads on the wafer before the parts are sliced from the wafer, which can also be economically desirable.

For the W2 W hybrid bonding technique, two wafers can be face bonded together, as noted above. Then, individual wafer portions that can include die-to-die (D2D) bonds formed during the W2 W bonding are cleaved or sliced apart. Thus, the wafer portions can include individual die pairs that have been W2 W bonded together.

Whether D2 W or W2 W, the hybrid bonding technique serves to form a face-to-face or surface bond between two semiconductor parts. The bonding surfaces may be prepared to facilitate a bond having sufficient bond strength, such as by planarizing each surface to be bonded. In various embodiments, CMP and other surface treatments may be used to prepare the part surfaces to be bonded together, among other processing steps.

As noted, the bonded surfaces may comprise various materials that can be bonded together, such as metals, dielectrics, or polymers, among others. In some embodiments, or at certain locations on a semiconductor part face, a metal-to-metal bond may be formed, such as for interconnecting conductive traces to form circuit paths. In particular embodiments, or at certain locations on a semiconductor part face, a silicon-to-silicon or silicon oxide-to-silicon oxide bond may be formed, such as to join insulating portions of the respective faces. The bonding technique may employ an adhesive that is applied to facilitate the face-to-face bond. For example, a glass frit paste may be applied to a die face and may be patterned before the die face is bonded to another part. In some cases, an anodic bond may be formed between a glass wafer and a silicon die by joining and then applying a sufficient voltage. In some embodiments, a polymer bond may be formed, such as by using a polymer as an adhesive layer that can be patterned and then bonded. In still other embodiments where a permanent bond is not desired, but a temporary bond is used, such as to hold certain parts together during subsequent processing steps, a wax bond may be formed that can later be removed. With a temporary bond, the bond strength is formed sufficient to keep the bonded parts together during the subsequent processing steps, which is often a lower bond strength than formed with permanent bonds.

Whether with or without an adhesive, the joined parts may be subsequently heated to form a solid material face-to-face surface bond, such as for metal-to-metal bonds, dielectric bonds, polymer bonds, or adhesive bonds, among others. In various embodiments, in addition to or instead of heating, a compressive force may be applied to joined parts to form a desired bond. The application of both force and heat is referred to as thermocompression to form a surface bond and may be performed at various temperatures and pressures in different contexts. For example with anodic bonding, a voltage may also be applied to effectuate a surface bond in some embodiments.

Accordingly, various techniques and applications may rely on D2 W and W2 W bonding to create permanent or temporary bonds having a desired bond strength. The proper formation of D2 W and W2 W bonds having the desired bond strength is thus a technologically important operation for semiconductor fabrication. Therefore, in order to evaluate and validate D2 W and W2 W bonding processes, such as for quality control or other statistical purposes, accurately ascertaining a measure of the actual bond strength of D2 W and W2 W bonds is also an important technological operation in the semiconductor industry. Determining or measuring the bond strength of D2 W and W2 W bonds is typically done using destructive testing of characteristic parts, such as by testing to failure certain characteristic samples of D2 W or W2 W bonded wafer portions.

Certain destructive testing methods for determining the bond strength of D2 W and W2 W bonds have typically been used. For example, shear testing of surface bonds involves the application of a lateral shear force to record a failure force for a die to break off from a bonded surface, such as a wafer. With lateral shear testing, the force applied may not propagate through the entire bond face, such as when a portion of the surface bond under test breaks apart, or when portions of the surface bond fail or break before other portions due to the non-uniform application of lateral force across the bond face. In another example, a double-cantilever beam (DCB) test, also referred as a blade test or crack test, involves inserting a thin sharpened blade into the surface bond at a lateral end portion of the surface bond. As a result, the surface bond is separated by a fixed amount such that a respective portion of each bonded substrate is separated into a quasi-cantilevered beam. While such blade tests are widely used, the test is limited to regions of the wafer that are near a bevel to direct this blade properly into the bond interface. Yet another example test is an indentation test, where an indentation is applied to the die face with a given force and a measure of the resulting delamination of the bond is recorded. In such indentation tests, similar to the blade test, only a portion of the bond face may be tested such that the bond energy of the entire bond face is not directly indicated by the partial delamination of the bond. Another example test is a pull test, where a bonded part is pulled vertically apart in a direction normal to the bond face. The pull test may be a poor indicator of the surface bond strength for similar reasons as the lateral shear test, and may further involve difficulties with attachment to the backside of the part being pulled with sufficient and uniform testing force. Still another known testing method is a three-point bending test that can apply a bending force at the center of the bonded parts, but which is also subject to partial delamination and incomplete measurement of the surface bond strength. One common disadvantageous aspect of such known surface bond testing methods is that the application of force may not occur primarily or solely in the same plane as the bond face, resulting in testing results that can poorly reflect an actual bond strength of the D2 W or W2 W bond, which is not desirable.

As will be described in further detail herein, torsional shear testing for semiconductor surface bonds is disclosed. The methods and systems for torsional shear testing for semiconductor surface bonds disclosed herein may provide an accurate and reliable measurement or indication of an actual bond strength of a die bond. The methods and systems for torsional shear testing for semiconductor surface bonds disclosed herein may be used for D2 W and W2 W bonding arrangements, among others. The methods and systems for torsional shear testing for semiconductor surface bonds disclosed herein may provide application of testing force to failure in a plane of the surface bond. The methods and systems for torsional shear testing for semiconductor surface bonds disclosed herein may provide application of testing force in a monotonic or cyclical manner. The methods and systems for torsional shear testing for semiconductor surface bonds disclosed herein may provide sufficient accuracy and precision in a measurement of an actual surface bond failure shear stress to estimate a bond strength of a surface bond. The methods and systems for torsional shear testing for semiconductor surface bonds disclosed herein may enable sufficient statistical accuracy to characterize a wafer having a plurality of surface bonds or a process associated with the wafer.

Referring now to the drawings, FIG. 1 is a depiction of a torsional shear test 100 for a semiconductor bonded part in one embodiment. FIG. 1 is a schematic drawing and is not drawn to scale or perspective. FIG. 1 is a generalized schematic for descriptive purposes and is not limiting for any particular design or structure or functionality associated with a torsional shear test for a semiconductor surface bond, as disclosed herein. In FIG. 1, torsional shear test 100 depicts a D2 W arrangement for surface bond testing using a torsional shear tool 110 that represents any of a variety of tools in different embodiments.

In FIG. 1, torsional shear tool 110 is comprised of a spindle 110-1 that is fixed to a frame 110-2. Spindle 110-1 as shown is enabled to rotate torsional shear tool 110 about a central axis 110-5 in angular rotation as given by arrow 106. Accordingly, in various embodiments, torsional shear tool 110 may be enabled to rotate freely or may be subject to an applied rotational force, such as by a motor or other rotational drive system (not shown). The rotation of torsional shear tool 110 using spindle 110-1 may also be controlled for a given angular displacement. It is also noted that torsional shear tool 110 may be used with a gantry-type XY positioning system (not shown) that enables central axis 110-5 to be located at a desired location, such as at a center point of a semiconductor die 102 bonded to a wafer 104 with a surface bond 120 therebetween, as shown in FIG. 1. For example, wafer 104 may have a plurality of die such as die 102 surface bonded to wafer 104 at different locations. Although not shown in FIG. 1 for descriptive clarity, wafer 104 can be held fixed in a desired position using various means, such as using at least one of a vacuum, an electro static chuck, a wafer clamp, and a pin, among other means. Furthermore, torsional shear tool 110 as shown is enabled to move up or down in a Z axis direction, as given by arrow 107.

In torsional shear test 100 of FIG. 1, in addition to positioning and rotating, as described above, frame 110-2 can enable torsional shear tool 110 to open or close at least one pair of jaws, shown in cross-section as jaws 110-3 and 110-4 that move together or apart to grasp die 102, as given by arrow 105. It is noted that frame 110-2 and jaws 110-3, 110-4 are depicted in schematic form in FIG. 1 and may represent any of a variety of designs and mechanisms for clamping and unclamping jaws 110-3, 110-4. In particular, torsional shear tool 110 may be enabled to apply a given clamping force using jaws 110-3, 110-4 and to measure the clamping force with at least one clamping force sensor (not shown). Furthermore, when jaws 110-3, 110-4 are clamped to die 102, as shown in FIG. 1, torsional shear tool 110 is enabled to apply a given rotational shear force to die 102 and to measure a reactive shear force using at least one rotational shear sensor (not shown) and to record the reactive shear force. The rotational shear force and the measured reactive shear force may be static or dynamic in various embodiments. The dynamic forces may be monotonically increasing or may be cyclical (see also FIGS. 5 and 6). The force sensors used, such as the rotational shear sensor, may accordingly be enabled for static or dynamic force measurements.

Figure 2:
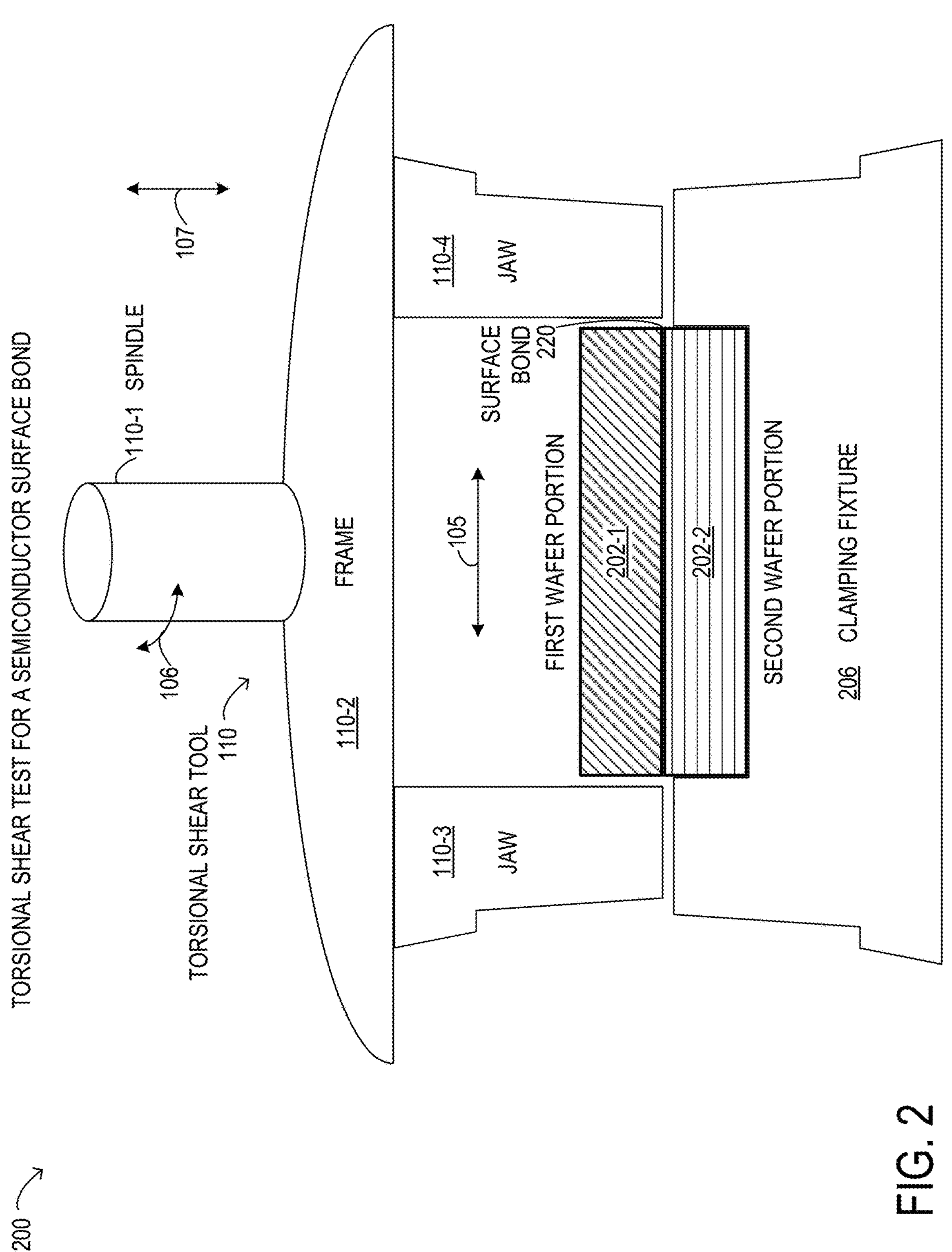
FIG. 2 is a depiction of a torsional shear test for a semiconductor surface bond in one embodiment.

FIG. 2 is a depiction of a torsional shear test 200 for a semiconductor die in one embodiment. FIG. 2 is a schematic drawing and is not drawn to scale or perspective. FIG. 2 is a generalized schematic for descriptive purposes and is not limiting for any particular design or structure or functionality associated with a torsional shear test for a semiconductor surface bond, as disclosed herein. In FIG. 2, torsional shear test 200 depicts a W2 W arrangement for die bond testing using torsional shear tool 110 that represents any of a variety of tools in different embodiments. Torsional shear test 200 in FIG. 2 is similar and includes many common elements as described above with respect to FIG. 1. In the W2 W arrangement of torsional shear test 200, a surface bond 220 of a W2 W bonded semiconductor part 202 comprising a first wafer portion 202-1 and a second wafer portion 202-2 is subject to rotational shear testing. In the W2 W arrangement shown in FIG. 2, second wafer portion 202-2 is held fixed in a clamping fixture 206, which is drawn schematically to represent any of a variety of clamping fixtures. Second wafer portion 202-2 is held fixed in a manner allowing bond 220 to be raised and exposed above a top surface of clamping fixture 206, such that the testing arrangement with clamping fixture 206 does not interfere with the application of torsional force to a plane of surface bond 220. Except for the clamping of second wafer portion 202-2 in clamping fixture 206, torsional shear test 200 is similar to torsional shear test 100 with respect to torsional shear tool 110 described above, with first wafer portion 202-1 in FIG. 2 replacing semiconductor die 102 in FIG. 1.

In operation of torsional shear test 100, 200, torsional shear tool 110 may be centered on a surface bonded part, such as D2 W bonded semiconductor die 102 or W2 W bonded semiconductor part 202 and may clamp one substrate of the surface bonded part, such as die 102 or first wafer portion 202-1, using jaws 110-3, 110-4. Then, torsional shear tool 110 may apply a torsional shear force (e.g., torque) to the clamped substrate by rotation of spindle 110-1 or by using an equivalent means of applying torque. As the torsional shear force is applied to the clamped substrate, surface bond 120, 220 respectively is subject to the torsional shear force and may fail at a certain force condition, causing surface bond 120, 220 to break and the clamped substrate to break away, at least in part. While the torsional shear force is applied, the reactive torsional shear force or torque is measured and recorded. From the recorded torsional shear forces, a bond strength, a bond energy, and a fatigue strength of surface bond 120, 220 can be ascertained in various embodiments.

Figures 3A, 3B:
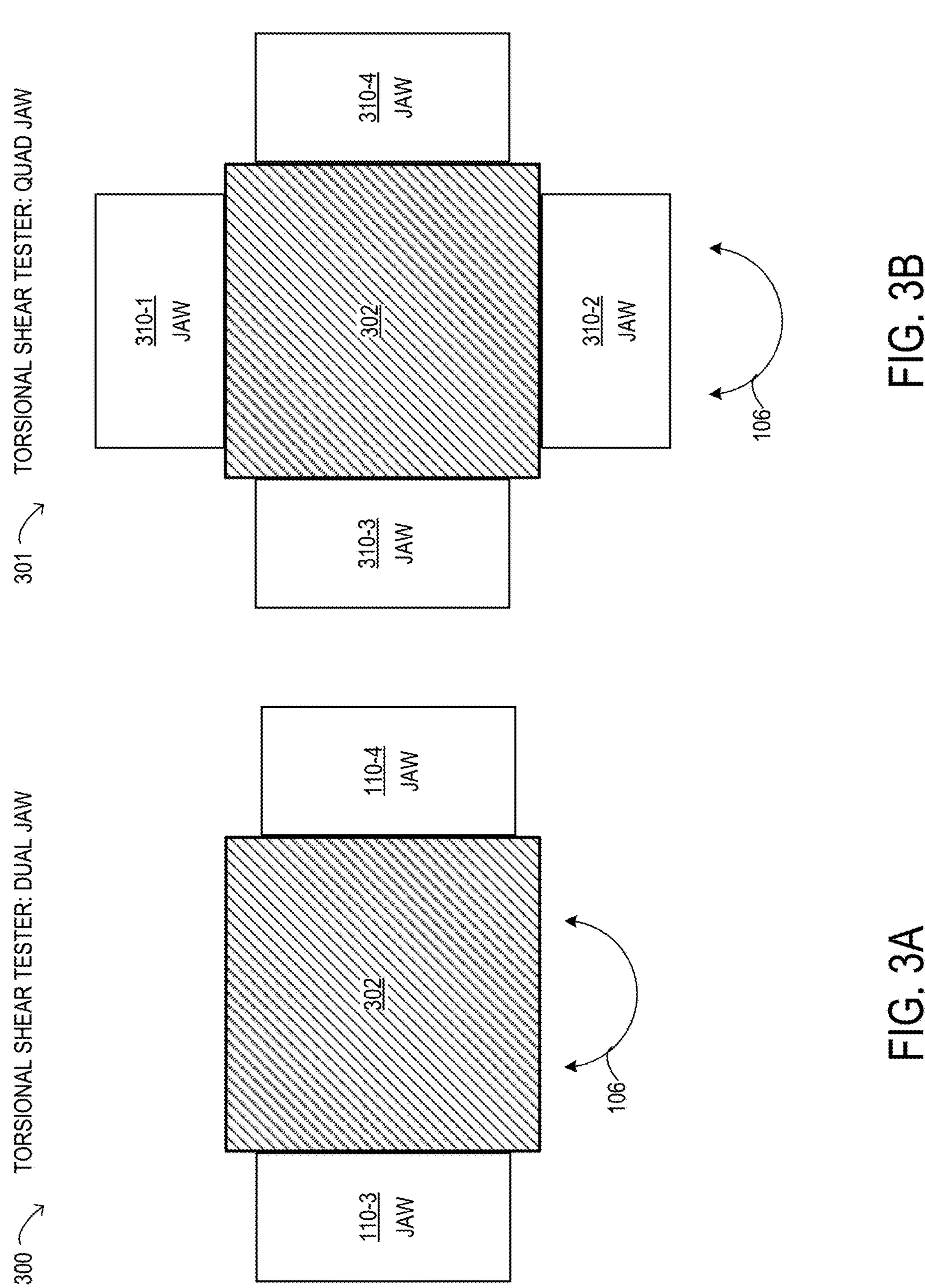
FIGS. 3A and 3B are depictions of jaws for torsional shear testing for a semiconductor surface bond in one embodiment.

In FIGS. 3A and 3B two different arrangements of the jaws used with torsional shear tool 110 are shown. FIGS. 3A and 3B are schematic illustrations from a top sectional view and are not limiting for any particular design or implementation of the jaws themselves (see also FIGS. 4A and 4B). In FIG. 3A, torsional shear tester 300 with a dual jaw configuration is shown, corresponding to torsional shear tool 110 shown and described above with respect to FIGS. 1 and 2 using jaws 110-3, 110-4. In FIG. 3B, torsional shear tested 301 with a quad jaw configuration using a first pair of jaws 310-1, 310-2 and a second pair of jaws 310-3, 310-4 that are orthogonal to jaws 310-1, 310-2. Each pair of jaws 310 may be operated in similar manner as described above with respect to jaws 110-3, 110-4, such as to clamp a die 302 for torsional shear testing, as described herein.

Figure 4A:
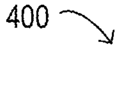
FIGS. 4A and 4B are depictions of jaw pads for torsional shear testing for a semiconductor surface bond in one embodiment.
Figure 4A:
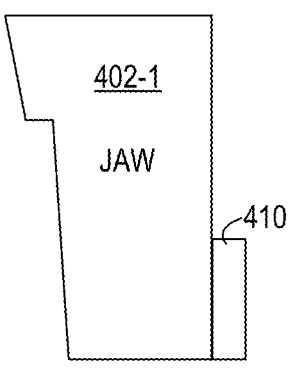
Figure 4A:
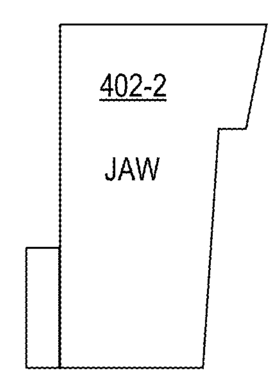
Figure 4B:
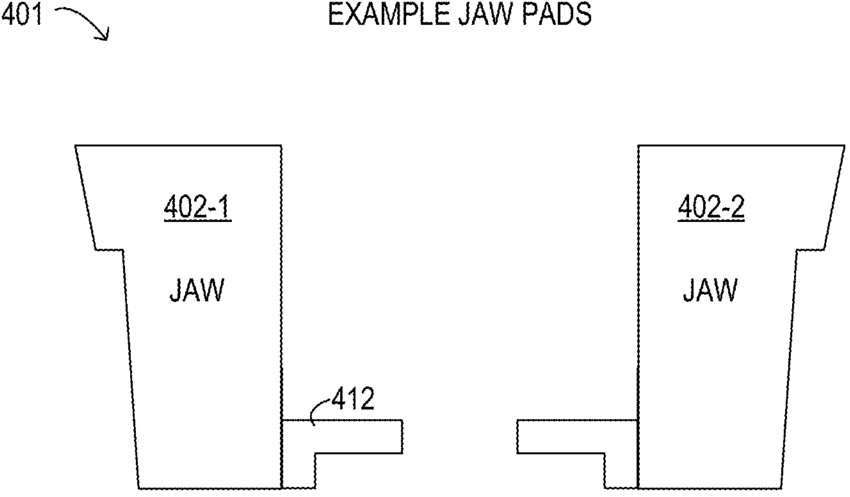

In FIGS. 4A and 4B, depictions of a pair of jaws 402 are shown with respective jaw pads to show various arrangements for clamping a semiconductor die that is a UUT for torsional shear testing, as described herein. Jaws 402 may represent embodiments of jaws 110-3, 110-4, 310 as described previously. In FIG. 4A, jaws 402-1, 402-2 are shown with respective jaw pads 410 that may extend to clamp a surface-bonded semiconductor part from a side face. In FIG. 4B, jaws 402-1, 402-2 are shown with respective jaw pads 412 that may extend to clamp a surface-bonded semiconductor part from a side face and a top face. It is noted that various different shapes and forms of jaw pads may be used in different embodiments. It is also noted that a shape of jaws 402 themselves may vary in different embodiments. For example, a width of an individual jaw may taper down to accommodate a minimum distance between D2 W bonded die on a semiconductor wafer. Furthermore, a material used for jaws 402 or jaw pads 410, 412 may vary according to particular desired properties, such as mechanical, chemical, electrical, or insulating properties.

Accordingly, in various embodiments, torsional shear tool for testing bond strength of semiconductor surface bonds is disclosed. The torsional shear tool may include a frame fixed to a spindle enabled to apply torque to the frame, and at least one pair of opposing jaws coupled to the frame, the opposing jaws enabled to clamp a surface-bonded semiconductor part at vertical edges of the part and transmit the torque applied by the spindle to a plane of the surface bond. With respect to the torsional shear tool, when the surface-bonded semiconductor part has a bond to a substrate that is held stationary with respect to the torsional shear tool, the spindle and opposing jaws may be enabled to apply a torque value of the torque sufficient to break the surface bond, such that the torque value is applied in-plane to the bond. In any of the disclosed embodiments, the torsional shear tool may further include a sensor coupled to the spindle and enabled to measure the torque applied and the reactive torque of the surface bond.

Figure 5:
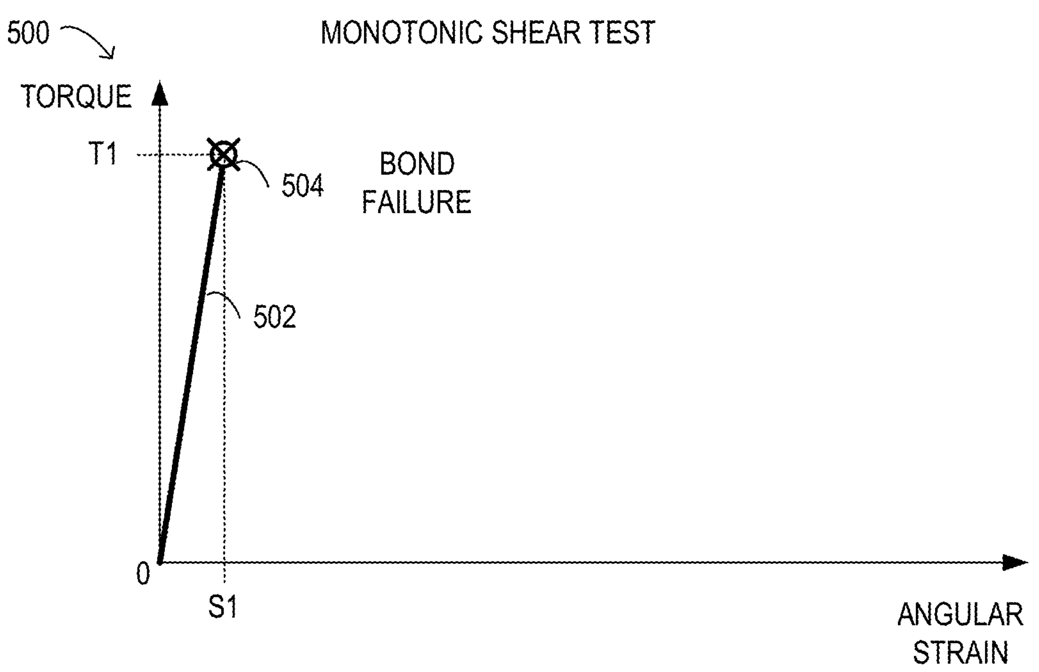
FIG. 5 is a plot of a monotonic shear test in one embodiment.

FIG. 5 is a plot 500 of a monotonic shear test in one embodiment. Plot 500 is an idealized plot and does indicate any actual measured data. Plot 500 depicts a curve 502 of torque versus angular strain for an increasing torque, such as applied monotonically to a surface-bonded semiconductor part for torsional shear testing of the semiconductor surface bond, as described herein. Although plot 500 does not indicate any factors associated with time, curve 502 may begin at zero and may increase as an increasing torque is applied to the surface-bonded part, such as using torsional shear tester 110 as described above. The torque shown by curve 502 may be a reactive torque that is measured as the applied torque is monotonically increased. At torque T1 and angular strain S1, a bond failure 504 is shown where the surface bond has been torqued to failure. For typical semiconductor parts, such as formed from a silicon substrate, the value of S1 may be very small and may be close to zero, indicating that very little or no elastic deformation has occurred, resulting in minimal or no angular strain to failure. Furthermore, curve 502 is linear indicating that no plastic deformation associated with the surface bond has occurred and thus, no yield point appears on curve 502 in this case. The methods and system for torsional shear testing for semiconductor surface bonds, as described herein, may be enabled to accurately and precisely measure T1 as a bond strength of the surface bond. For example, various values for T1 of surface bonds on a single wafer may be characteristic values for the wafer or for processing steps associated with the wafer.

Figure 6:
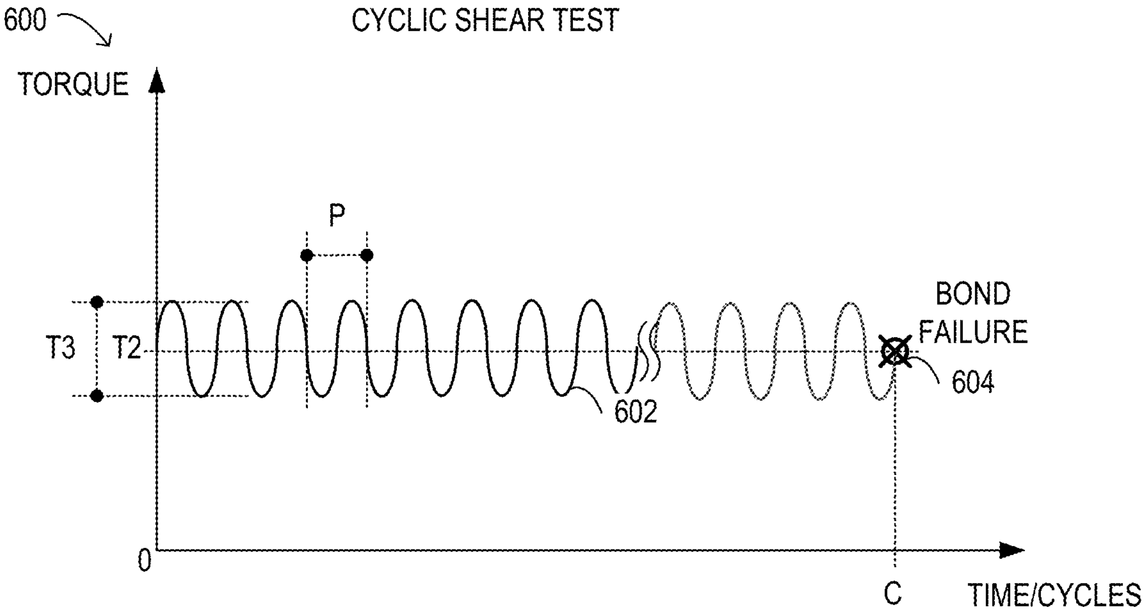
FIG. 6 is a plot of a cyclic shear test in one embodiment.

FIG. 6 is a plot 600 of a cyclical shear test in one embodiment. Plot 600 is an idealized plot and does indicate any actual measured data. Plot 600 depicts an oscillating curve 602 of torque versus time or cycles, such as applied cyclically to a surface-bonded semiconductor part for torsional shear testing of semiconductor surface bonds, as described herein. The cyclic shear test as shown in plot 600 may be an alternative to the monotonic shear test shown in plot 500 in FIG. 5, in some embodiments. In oscillating curve 602 of the cyclic shear test, an oscillating torque with an offset of T2 and a peak-peak amplitude of T3 is shown measured as reactive torque in response to application of associated cyclical torque using torsional shear tester 110, in particular embodiments as described herein. A period of the cyclic torque in plot 600 is given by P, which is the inverse of a frequency of the cyclic torque. At some point after some number of cycles of cyclic torque loading, a bond failure 604 is shown occurring at time/cycles C. The value C may be indicative of certain properties of the surface bond, such a fatigue strength or other fatigue properties that may be characteristic for the materials and process used. Accordingly, the value C may be measured and compared with different surface bonds to obtain relevant statistical values, such as for quality control purposes. For example, various values for C of surface bonds on a single wafer may be characteristic values for the wafer or for processing steps associated with the wafer.

Figure 7:
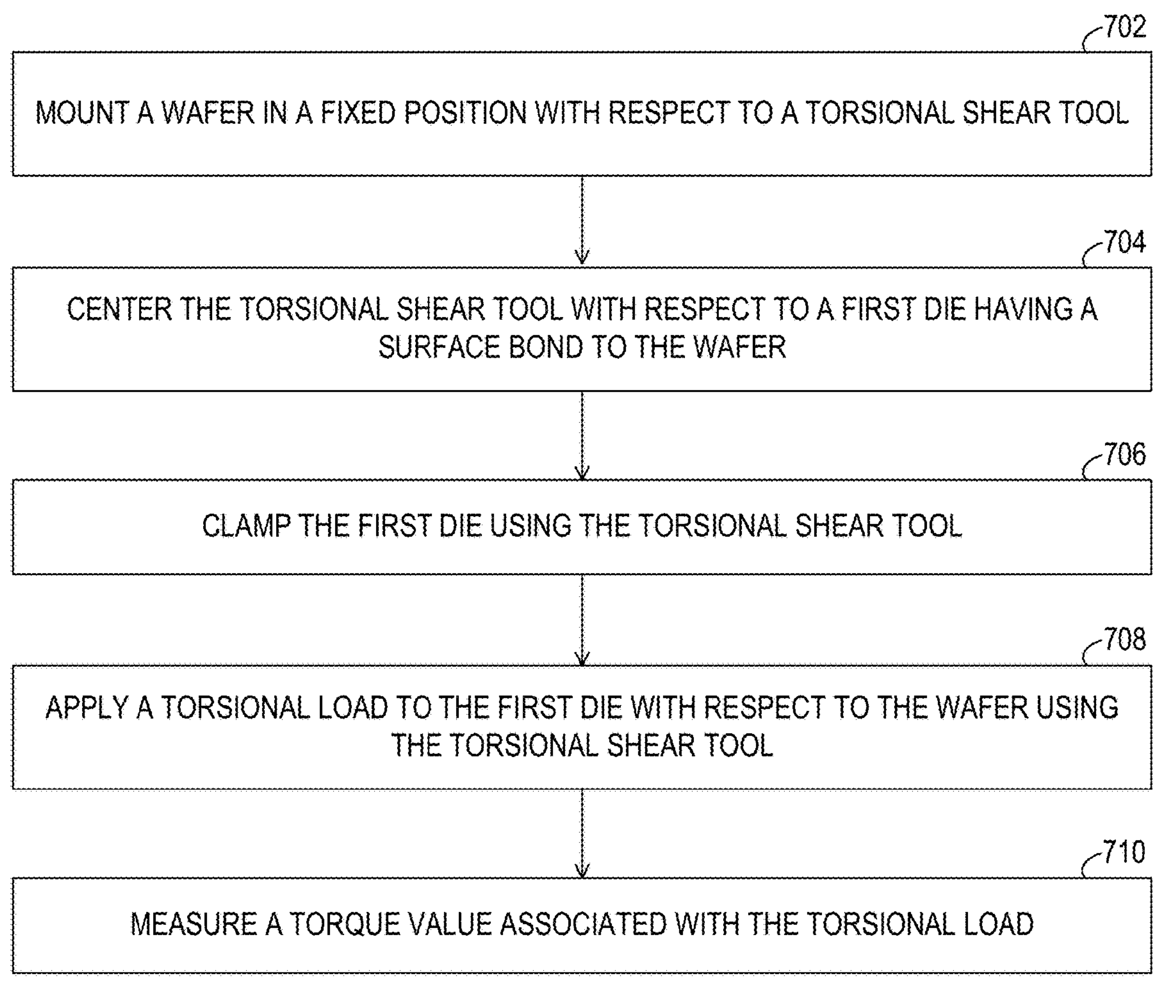
FIG. 7 is a depiction in flow chart form of a method for testing semiconductor surface bonds.

Referring now to FIG. 7, a flow chart of a method 700 for testing semiconductor surface bonds is shown. Method 700 is directed to D2 W surface bonds as described herein. It is noted that certain operations in method 700 may be rearranged or omitted in various embodiments.

Method 700 may begin at step 702 by mounting a wafer in a fixed position with respect to a torsional shear tool. In step 702, the wafer can be held fixed in a desired position using various means, such as using at least one of a vacuum, an electro static chuck, a wafer clamp, and a pin, among other means. At step 704, the torsional shear tool is centered with respect to a first die having a surface bond to a wafer. At step 706, the first die is clamped using the torsional shear tool. At step 708, a torsional load is applied to the first die with respect to the wafer using the torsional shear tool. The torsional load in step 708 may be monotonically increasing or may be cyclical. At step 710, a torque value associated with the torsional load is measured.

According, in various embodiments, a first method of testing semiconductor surface bonds is disclosed. The first method may include centering a torsional shear tool with respect to a first die having a surface bond to a wafer, clamping the first die using the torsional shear tool, applying a torsional load to the first die with respect to the wafer using the torsional shear tool, and measuring a torque value associated with the torsional load. In any of the disclosed embodiments of the first method, the wafer is bonded to a plurality of die including the first die. In any of the disclosed embodiments, the first method may further include performing at least some of the first method for at least a subset of the plurality of die to measure torque values respectively associated with the subset, such that the torque values measured may be characteristic for the wafer. In any of the disclosed embodiments of the first method, clamping the first die and applying the torsional load may further include clamping the die with jaws and applying the torsional load using the jaws. In the first method, the jaws may be in contact with the first die. In any of the disclosed embodiments, clamping the first die may further include at least one of: clamping the die with two opposing jaws, and clamping the first die with two pairs of opposing jaws. In the first method, each pair of opposing jaws may be orthogonal to each other. In any of the disclosed embodiments of the first method, the torsional load may be a monotonically increasing torque, while the torque value may be a failure torque for the first die, the failure torque being indicative of a bond strength of the surface bond. In any of the disclosed embodiments of the first method, the torsional load may be a cyclic torque, while the torque value may be associated with a number of cycles of the cyclic torque to failure of the surface bond. In any of the disclosed embodiments of the first method, the number of cycles of the cyclic torque to failure of the surface bond may be indicative of a fatigue strength of the surface bond. In any of the disclosed embodiments, the first method may further include normalizing the torque value to a bond area associated with the surface bond to calculate a bond energy value.

Figure 8:
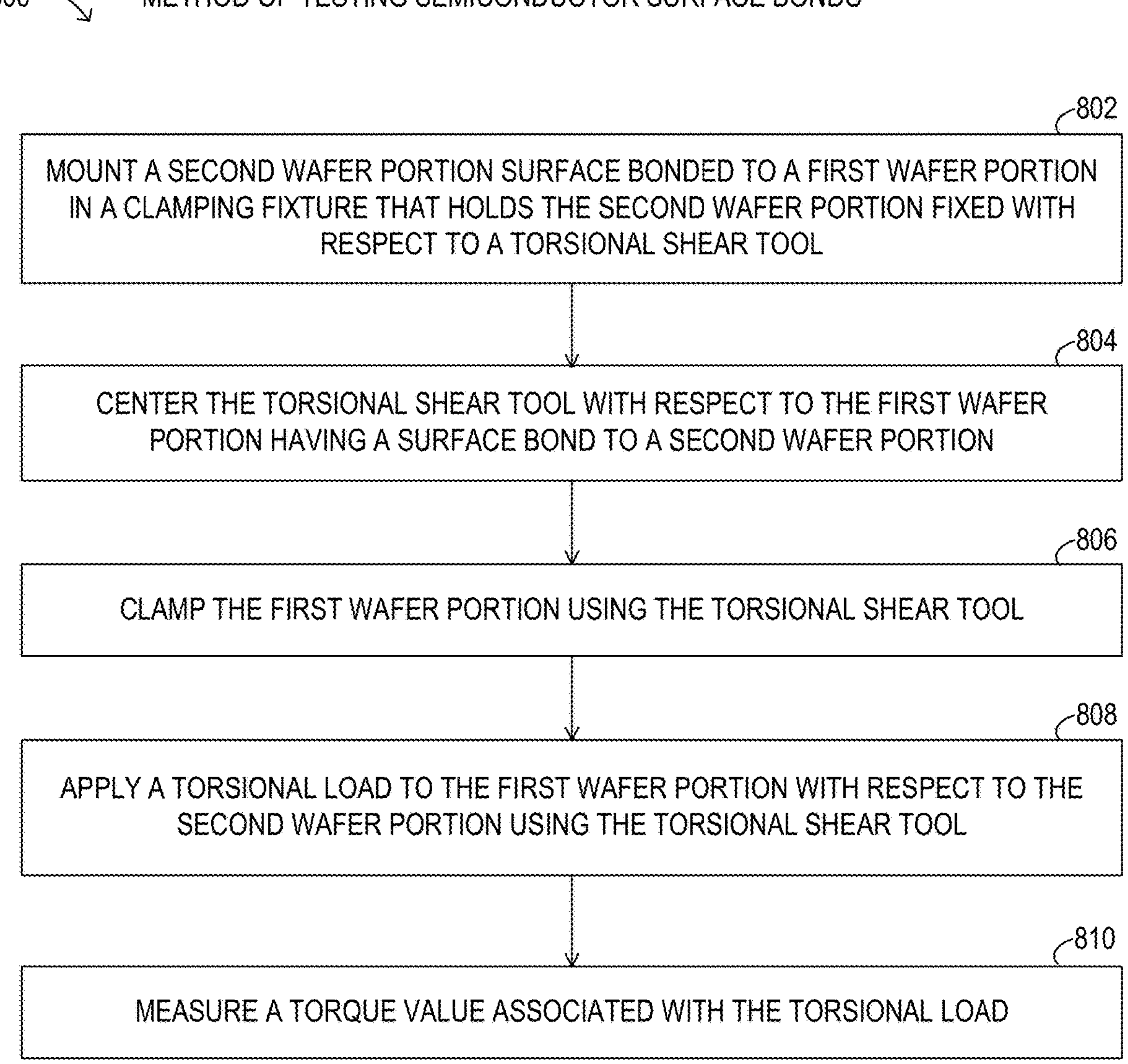
FIG. 8 is a depiction in flow chart form of a method for testing semiconductor surface bonds.

Referring now to FIG. 8, a flow chart of a method 800 for testing semiconductor surface bonds is shown. Method 800 is directed to W2 W surface bonds as described herein. It is noted that certain operations in method 800 may be rearranged or omitted in various embodiments.

Method 800 may begin at step 802 by mounting a second wafer portion surface bonded to a first wafer portion in a clamping fixture that holds the second wafer portion fixed with respect to a torsional shear tool. At step 804, the torsional shear tool is centered with respect to the first wafer portion having a surface bond to the second wafer portion. At step 806, the first wafer portion is clamped using the torsional shear tool. At step 808, a torsional load is applied to the first wafer portion with respect to the second wafer portion using the torsional shear tool. The torsional load in step 808 may be monotonically increasing or may be cyclical. At step 810, a torque value associated with the torsional load is measured.

Accordingly, in various embodiments, a second method of testing semiconductor surface bonds is disclosed. The second method may include centering a torsional shear tool with respect to a first wafer portion having a surface bond to a second wafer portion, clamping the first wafer portion using the torsional shear tool, applying a torsional load to the first wafer portion with respect to wafer portion second die using the torsional shear tool, and measuring a torque value associated with the torsional load. In the second method, the second wafer portion may be held fixed with respect to the torsional shear tool. In any of the disclosed embodiments of the second method, clamping the first wafer portion and applying the torsional load may further include clamping with jaws and applying the torsional load using the jaws. In the second method, the jaws may be contact with the first wafer portion. In any of the disclosed embodiments of the second method, clamping with the jaws may further include at least one of: clamping with two opposing jaws and clamping with two pairs of opposing jaws. In the second method, each pair of opposing jaws may be orthogonal to each other. In any of the disclosed embodiments of the second method, the torsional load may be a monotonically increasing torque, while the torque value may be a failure torque for the surface bond, the failure torque being indicative of a bond strength of the surface bond. In any of the disclosed embodiments of the second method, the torsional load may be a cyclic torque, while the torque value may be associated with a number of cycles of the cyclic torque to failure of the surface bond. In any of the disclosed embodiments of the second method, the number of cycles of the cyclic torque to failure of the surface bond may be indicative of a fatigue strength of the surface bond. In any of the disclosed embodiments of the second method, the first wafer portion and the second wafer portion are separated from two surface-bonded wafers after the surface bond is formed. In any of the disclosed embodiments, second method may further include repeating at least some of the second method for a plurality of first wafer portions respectively surface bonded to second wafer portions, such that the respective torque values measured may be characteristic for the two surface-bonded wafers.

Example embodiments are described below. Other embodiments can also be understood from the entirety of the specification as well as the claims filed herein.

Example 1. A method of testing semiconductor surface bonds includes centering a torsional shear tool with respect to a first die having a surface bond to a wafer, clamping the first die using the torsional shear tool, applying a torsional load to the first die with respect to the wafer using the torsional shear tool, and measuring a torque value associated with the torsional load.

Example 2. The method of example 1, where the wafer is bonded to a plurality of die including the first die.

Example 3. The method of examples 1 or 2, further including performing the method of claim 1 for at least a subset of the plurality of die to measure torque values respectively associated with the subset, wherein the torque values measured are characteristic for the wafer.

Example 4. The method of any of examples 1 to 3, where clamping the first die and applying the torsional load further include clamping the die with jaws and applying the torsional load using the jaws, where the jaws are in contact with the first die.

Example 5. The method of any of examples 1 to 4, where clamping the first die further includes at least one of: clamping the die with two opposing jaws; and clamping the first die with two pairs of opposing jaws, wherein each pair of opposing jaws are orthogonal to each other.

Example 6. The method of any of examples 1 to 5, where the torsional load is a monotonically increasing torque and where the torque value is a failure torque for the first die, the failure torque being indicative of a bond strength of the surface bond.

Example 7. The method of any of examples 1 to 6, where the torsional load is a cyclic torque and where the torque value is associated with a number of cycles of the cyclic torque to failure of the surface bond.

Example 8. The method of any of examples 1 to 7, where the number of cycles of the cyclic torque to failure of the surface bond is indicative of a fatigue strength of the surface bond.

Example 9. The method of any of examples 1 to 8, further including normalizing the torque value to a bond area associated with the surface bond to calculate a bond energy value.

Example 10. A method of testing semiconductor surface bonds includes centering a torsional shear tool with respect to a first wafer portion having a surface bond to a second wafer portion, where the second wafer portion is held fixed with respect to the torsional shear tool. The method of example 10 includes clamping the first wafer portion using the torsional shear tool, applying a torsional load to the first wafer portion with respect to the second wafer portion using the torsional shear tool, and measuring a torque value associated with the torsional load.

Example 11. The method of example 10, where clamping the first wafer portion and applying the torsional load further include clamping with jaws and applying the torsional load using the jaws, wherein the jaws are in contact with the first wafer portion.

Example 12. The method of example 10 or 11, where clamping with the jaws further includes at least one of: clamping with two opposing jaws, and clamping with two pairs of opposing jaws, where each pair of opposing jaws are orthogonal to each other.

Example 13. The method of any of examples 10 to 12, where the torsional load is a monotonically increasing torque, and where the torque value is a failure torque for the surface bond, the failure torque being indicative of a bond strength of the surface bond.

Example 14. The method of any of examples 10 to 14, where the torsional load is a cyclic torque, and where the torque value is associated with a number of cycles of the cyclic torque to failure of the surface bond.

Example 15. The method of any of examples 10 to 14, where the number of cycles of the cyclic torque to failure of the surface bond is indicative of a fatigue strength of the surface bond.

Example 16. The method of any of examples 10 to 15, where the first wafer portion and the second wafer portion are separated from two surface-bonded wafers after the surface bond is formed.

Example 17. The method of any of examples 10 to 16, further including repeating the method of example 10 for a plurality of first wafer portions respectively surface bonded to respective second wafer portions, where the respective torque values measured are characteristic for the two surface-bonded wafers.

Example 19. A torsional shear tool for testing bond strength of semiconductor surface bonds includes a frame fixed to a spindle enabled to apply torque to the frame, and at least one pair of opposing jaws coupled to the frame, the opposing jaws enabled to clamp a semiconductor die at vertical edges of the semiconductor die and transmit the torque applied by the spindle to the semiconductor die. In the torsional shear tool of example 19, when the semiconductor die has a surface bond to a substrate that is held stationary with respect to the torsional shear tool, the spindle and opposing jaws are enabled to apply a torque value of the torque sufficient to break the surface bond, where the torque value is applied in-plane to the surface bond.

Example 20. The torsional shear tool of example 19, further including a sensor coupled to the spindle and enabled to measure the torque applied.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

While this disclosure has been described with reference to illustrative embodiments, this description is not intended to be construed in a limiting sense. Various modifications and combinations of the illustrative embodiments, as well as other embodiments, will be apparent to persons skilled in the art upon reference to the description. It is therefore intended that the appended claims encompass any such modifications or embodiments.

What is claimed is:

1. A method of testing semiconductor surface bonds, the method comprising:

centering a torsional shear tool with respect to a first die having a surface bond to a wafer;

clamping the first die using the torsional shear tool, wherein clamping the first die further comprises at least one of: clamping the first die with two opposing jaws; and clamping the first die with two pairs of opposing jaws, wherein each pair of opposing jaws is orthogonal to each other;

applying a torsional load to the first die with respect to the wafer using the torsional shear tool; and measuring a torque value associated with the torsional load.

2. The method of claim 1, wherein the wafer is bonded to a plurality of dies including the first die.

3. The method of claim 2, further comprising performing the method of claim 1 for at least a subset of the plurality of dies to measure torque values respectively associated with the subset, wherein the torque values measured are characteristic for the wafer.

4. The method of claim 1, wherein the torsional load is a monotonically increasing torque and wherein the torque value is a failure torque for the first die, the failure torque being indicative of a bond strength of the surface bond.

5. The method of claim 1, wherein the torsional load is a cyclic torque and wherein the torque value is associated with a number of cycles of the cyclic torque to failure of the surface bond.

6. The method of claim 5, wherein the number of cycles of the cyclic torque to failure of the surface bond is indicative of a fatigue strength of the surface bond.

7. The method of claim 1, further comprising normalizing the torque value to a bond area associated with the surface bond to calculate a bond energy value.

8. A method of testing semiconductor surface bonds, the method comprising:

centering a torsional shear tool with respect to a first wafer portion having a surface bond to a second wafer portion, wherein the second wafer portion is held fixed with respect to the torsional shear tool;

clamping the first wafer portion using the torsional shear tool;

applying a torsional load to the first wafer portion with respect to the second wafer portion using the torsional shear tool; wherein clamping the first wafer portion and applying the torsional load further comprise clamping with jaws, the jaws comprising at least one of: two opposing jaws; and two pairs of opposing jaws, wherein each pair of opposing jaws are orthogonal to each other; and measuring a torque value associated with the torsional load.

9. The method of claim 8, wherein the torsional load is a monotonically increasing torque, and wherein the torque value is a failure torque for the surface bond, the failure torque being indicative of a bond strength of the surface bond.

10. The method of claim 8, wherein the torsional load is a cyclic torque, and wherein the torque value is associated with a number of cycles of the cyclic torque to failure of the surface bond.

11. The method of claim 10, wherein the number of cycles of the cyclic torque to failure of the surface bond is indicative of a fatigue strength of the surface bond.

12. The method of claim 8, wherein the first wafer portion and the second wafer portion are separated from two surface-bonded wafers after the surface bond is formed.

13. The method of claim 12, further comprising repeating the method of claim 10 for a plurality of first wafer portions respectively surface bonded to second wafer portions, wherein the respective torque values measured are characteristic for the two surface-bonded wafers.

14. A torsional shear tool for testing bond strength of semiconductor surface bonds, the torsional shear tool comprising:

a frame fixed to a spindle enabled to apply torque to the frame;

a sensor coupled to the spindle and enabled to measure a torque value of the torque being applied; and at least one pair of opposing jaws coupled to the frame, the opposing jaws enabled to clamp a semiconductor die at vertical edges of the semiconductor die and transmit the torque applied by the spindle to the semiconductor die, wherein when the semiconductor die has a surface bond to a substrate that is held stationary with respect to the torsional shear tool, the spindle and opposing jaws are enabled to apply a torque value of the torque sufficient to break the surface bond, wherein the torque value is applied in-plane to the surface bond.

15. The torsional shear tool of claim 14, wherein the torque value is selected from one of: a monotonically increasing torque; and a cyclic torque.

16. The torsional shear tool of claim 14, wherein the at least one pair of opposing jaws comprises jaw pads configured to clamp a semiconductor die from a side face of the semiconductor die.

17. The torsional shear tool of claim 14, wherein the at least one pair of opposing jaws comprises jaw pads configured to clamp a semiconductor die from a side face and a top face of the semiconductor die.

18. The torsional shear tool of claim 14, wherein a width of at least one of the opposing jaws tapers.

* * * * *